June 7, 1949.　　　　M. M. MARCIL　　　　2,472,431
UNIVERSAL HEIGHT GAUGE ATTACHMENT
Filed Nov. 17, 1947

INVENTOR.
Mitchell M. Marcil
BY Victor J. Evans & Co.
ATTORNEYS

Patented June 7, 1949

2,472,431

UNITED STATES PATENT OFFICE 2,472,431

UNIVERSAL HEIGHT GAUGE ATTACHMENT

Mitchell M. Marcil, Springfield, Mass.

Application November 17, 1947, Serial No. 786,348

3 Claims. (Cl. 33—172)

This invention relates to a height gauge attachment for dial indicators.

It is an object of the present invention to provide a height gauge attachment for dial indicators whereby the point adapted to engage the work piece can be extended into normally inaccessible places to test the same, and wherein the dial indicator may be provided with the point on a part of a hinged extension whereby the dial and the point can be raised out of the work piece by the hinging movement of the part.

Other objects of the present invention are to provide a height gauge attachment for dial indicators to permit the measurement of the work piece in normally inaccessible places therein.

For a better understanding of the invention, reference may be had to the following detailed description taken in connection with the accompanying drawing, in which.

Figure 1:
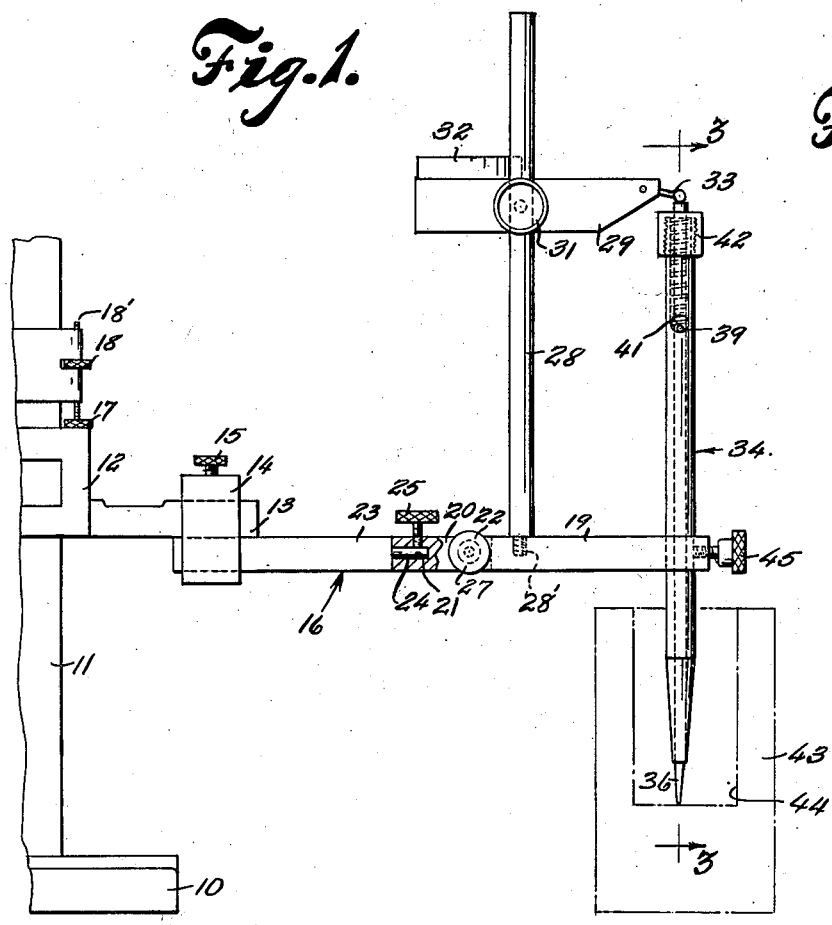
Figure 1 is a fragmentary elevational view of a dial indicator device having the attachment of the present invention.
Figure 3:
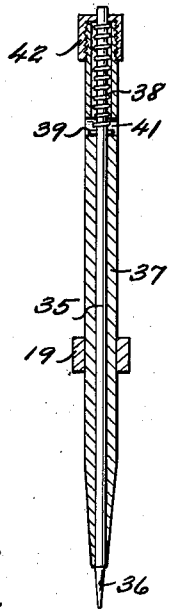
Figure 3 is a cross-sectional view taken through the point device and on line 3—3 of Figure 1.
Figure 2:
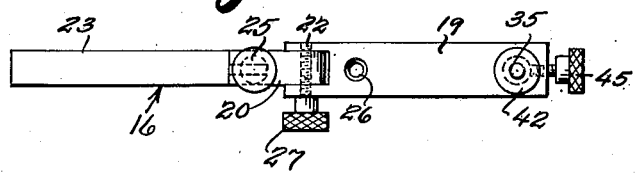
Figure 2 is a top plan view of the hinged parts.

Referring now to the figures, 10 represents a base upwardly from which there extends a scale 11, on which there is slidably adjusted a bracket 12, having an extension 13 over which is placed a clamp 14, with a set screw 15 for securing thereto the height attachment 16 embodying the features of the present invention. The bracket 12 may be adjusted on the scale by turning the knurled element 18 on the screw 18' fixed in the element 17 on the bracket 12.

The attachment 16 comprises a hinged extension having parts 19 and 20 hinged together for vertical pivotal movement by a hinged connection 22. An extension 23 is connected to the extension 13 by the clamp 14 and the part 20 of the height attachment 16 is connected to the extension 23 by means of a reduced diameter portion or stud 24 fitted into the bore 21 in the part 20. These parts are secured against axial displacement from one another by engagement of the thumb screw 25 with the portion 24.

The hinge connection 22 includes a thumb screw 27 for the control thereof.

Extending upwardly from the part 19, is a post 28 on which is mounted the dial indicator 29. The post 28 has a reduced threaded portion 28' which is receivable in the tapped bore 26 in the part 19, whereby the part is fixed to the part 19. The indicator can be adjusted to any height on the post, and is secured by a thumb screw 31.

A dial 32 is provided on the indicator from which readings may be taken. An arm 33 extends from the indicator.

An indicator of the type used is disclosed in the Lowe Patent 1,964,168. On the outer end of the part 19, there may be adjustably secured, a point device 34 having a rod 35 with a rounded or blunt point 36 thereon. This rod is spring mounted in a sleeve 37. The point of the rod extends from the lower end of the sleeve 37. On the upper end of the rod is a spring 38. A pin 39 extends transversely through the rod to retain the springs 38 and this pin can move up and down in a transverse hole 41 of the sleeve 37. The spring 38 is retained in the upper end of the sleeve 37 by a threaded cap 42 fitted on the upper end of the sleeve 37. The rod 35 extends outwardly through a hole through the cap 42 so that the arm 33 of the testing device 29 may abut the same. By virtue of the pointer device, a reading can be taken on a work piece 43 in the bottom of an opening 44 thereof. The pointer device is retained in the end of the part 19 by a thumb screw 45. The hinge connection 22 permits the point device 34 to be swung transversely of the opening 44, and the portion 24 permits the point device to be swung longitudinally of the opening 44. Thus the combination swivel and hinge connection permits all corners of the opening to be reached.

While various changes may be made in the detailed construction, it shall be understood that such changes shall be within the spirit and scope of the present invention, as defined by the appended claims.

I claim:

1. A height gauge attachment for a dial indicator comprising parts hinged together and adapted to be connected to a horizontally extending bracket of a vertically disposed scale, means for locking the hinged parts at different angle positions thereon, a post extending from one of the parts in vertical relation thereto, a dial test indicator mounted on the post and a pointer device having a sleeve mounted in said last part in vertical relation thereto and in parallel relation to said post and said sleeve adapted to extend above and below the last mentioned part, for coaction with the dial indicator.

2. A height gauge attachment for a dial indicator comprising parts hinged together and adapted to be connected to a horizontally extending bracket of a vertically disposed scale, means for locking the hinged parts at different angle positions thereon, a post extending from one of the parts in vertical relation thereto, a dial test indicator mounted on the post and a pointer device having a sleeve mounted in said last part in vertical relation thereto and in parallel relation to said post and said sleeve adapted to extend above and below the last mentioned part, and the sleeve of said pointer device being vertically adjustable with relation to said last part and comprising a pointer rod vertically adjustable in the sleeve, and extending to a location above the upper end of the sleeve, and spring means extending between the sleeve and the rod for urging the rod downwardly from the sleeve and stop means for limiting the relative movement of the rod with respect to the sleeve, for coaction with the dial indicator.

3. A height gauge attachment for a dial indicator comprising parts hinged together and adapted to be connected to a horizontally extending bracket of a vertically disposed scale, means for locking the hinged parts at different angle positions thereon, a post extending from one of the parts in vertical relation thereto, a dial test indicator mounted on the post and a pointer device having a sleeve mounted in said last part in vertical relation thereto and in parallel relation to said post and said sleeve adapted to extend above and below the last mentioned part, and said pointer device comprising a rod slidably mounted in the sleeve, a cap fitted over the upper end of the sleeve and having an opening through which the rod is extended, said rod having an enlarged transversely extending hole therethrough, a pin extending through the rod and into the enlarged hole of the sleeve, said pin limiting the movement of the rod within the sleeve, and a spring surrounding the rod and reacting between the cap and the transverse pin in the rod, for coaction with the dial indicator.

MITCHELL M. MARCIL.

REFERENCES CITED

The following references are of record in the file of this patent:

UNITED STATES PATENTS

| Number | Name | Date |
|---|---|---|
| 2,327,948 | Webster | Aug. 24, 1943 |